US006107714A

United States Patent [19]

Fischer

[11] Patent Number: 6,107,714

[45] Date of Patent: *Aug. 22, 2000

[54] DRIVE UNIT FOR A HOIST

[75] Inventor: Hubert Fischer, Munich, Germany

[73] Assignee: Wittur Aufzugteile GmbH & Co., Wiedenzhausen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/094,794

[22] Filed: Jun. 15, 1998

[30] Foreign Application Priority Data

Jun. 12, 1997 [DE] Germany .......................... 197 24 920

[51] Int. Cl.[7] ...................................................... H02K 7/10

[52] U.S. Cl. ........................... 310/77; 310/75 B; 310/76; 310/156; 310/254; 310/261; 310/298; 310/273

[58] Field of Search .................................... 310/156, 254, 310/261, 268, 275; 87/17, 274, 266

[56] References Cited

U.S. PATENT DOCUMENTS

| | | | |
|---|---|---|---|
| 3,619,676 | 11/1971 | Kawakami et al. | 310/112 |
| 3,732,447 | 5/1973 | Perhats | 310/76 |
| 3,889,140 | 6/1975 | Baermann | 310/103 |
| 4,277,734 | 7/1981 | Uhrner et al. | 318/758 |
| 4,338,536 | 7/1982 | Hallidy | 310/191 |
| 5,018,603 | 5/1991 | Ito . | |
| 5,783,895 | 7/1998 | Hakala et al. | 310/268 |
| 5,899,301 | 5/1999 | Aulanko et al. | 187/266 |

FOREIGN PATENT DOCUMENTS

| | | |
|---|---|---|
| 0 706 968 | 7/1995 | European Pat. Off. . |
| 876 453 | 7/1949 | Germany . |
| 74 42 820 | 6/1976 | Germany . |
| 81 29 499 | 9/1981 | Germany . |
| 93 13 66 | 9/1993 | Germany . |
| 295 12 565 U | 8/1995 | Germany . |
| 2 048 201 | 12/1980 | United Kingdom . |

*Primary Examiner*—Elvin Enad

*Attorney, Agent, or Firm*—Thomas R. Vigil

[57] ABSTRACT

A drive unit for a hoist, an elevator in particular, with a motor (6), a transmission (2), a breaking means (4) and a housing (8) is characterized in that said motor (6) and said breaking means are together arranged in said housing (8). Furthermore, at least one part of said transmission (2) can be arranged in said housing (8) as mounted or built-in transmission so that said housing (8) for the largest part also forms the transmission housing.

13 Claims, 4 Drawing Sheets

DRIVE UNIT FOR A HOIST

BACKGROUND AND SUMMARY OF THE INVENTION

The present invention relates to a drive unit for a hoist, an elevator in particular, with a motor, a transmission, a braking means and a housing.

Such drive unit is known from EP 706 968. The drive unit known in this publication is of simple construction and has a short over-all length and generates low mass forces. The motor and the transmission can in cantilever manner be flanged to the brake housing serving as stator and thus being the only component requiring fixation on the foundation or socle. This solution proved to be successful, however, a further constructional simplification such that in case of compact, and possibly extremely compact, structure installation periods during assembly of the drive unit and/or insertion of the drive unit into an elevator are caused is desirable. The invention intends to solve this problem.

The invention achieves this aim by arranging a drive to support a brake body and a transmission drive shaft, by having a housing for a motor and the brake body arranged together, and by supporting the drive shaft exclusively at a wall which extends between the motor and the brake body. A drive unit is created which is superior to the generic prior art in that the motor as well as the braking unit (preferably including the support of the continuous drive shaft) together are arranged in the housing of the drive unit.

This is just not the case in EP 0 706 968, since there the motor together with its housing is flanged to a separate brake housing which also serves as stator for the entire drive unit. The invention takes another way, since it "saves" one of the housings and instead integrates the brake and motor thereof in one single construction. The particular advantage of this construction results from the simplification of assembly of the drive unit in the plant and in the reduced space required in an elevator. In case of retrofitting the space available for insertion often is very confined. When a worm gear pair has to be substituted for, a planetary gear has to fit in axial direction of the drive wheel, i.e. has to be aligned at 90° to the existing transmission.

In accordance with a preferred embodiment of the present invention, the construction is further simplified and shortened in that in the housing at least one (preferably essential) part of the transmission (planetary or cyclo or spur gear) is arranged as mounted transmission or as built-in transmission so that the housing in this part also forms the transmission housing. A separate transmission housing thus can be done without in this area (preferably only a housing cover is provided for still).

A further particularly preferred modification of the present invention further integrates brake and ventilator and/or rotor sleeve to form one unit. In this solution the housing can be constructed in the manner described above or in conventional construction. Brake and ventilator can be combined in particularly simple manner in that in the manner of a drum or disk ventilator blades are formed to the brake body. Optionally or alternatively furthermore a (pot-shaped) rotor sleeve is arranged on the brake drum (e.g. formed thereto).

By transferring the ventilator blades to the "outside" it is possible that the stator winding essentially protrudes into the interior of the brake drum for in this way reducing the constructional length. The unification of brake drum and rotor sleeve to form one cast part/shaped part results in a reduction of treatment and mounting costs and in a shortening of the drive shaft. In some sizes of construction even the support bearing at the shaft end can be done without, this contributing to a further reduction of costs and constructional length.

Further preferred embodiments of the invention result from that a continuous shaft forms the motor shaft as well as the transmission shaft and that the brake body is fixed within the brake housing on the shaft.

It turned out to be particularly advantageous to use a permanent magnet motor with rotor and stator, which (as compared to the remaining dimensions of the drive unit) is built in flat construction and is located "opposite" to the brake drum (realizable in infinitely variable manner) on the shaft. Therein e.g. the rotor of the permanent magnet motor is arranged on the (pot-shaped) outer wall of the brake drum and the stator is arranged on the inside wall of the housing. Thus, the brake drum serves as simultaneous carrier sleeve for the rotor, this opening the possibility of reducing the total diameter and the axial height of the drive. This e.g. is advantageous for applications in which the "constructional length" of the drive unit is less critical. Above all a high torque can be realized in case of small rotor diameter.

In another manner of realization of a permanent magnet drive an extremely narrow motor (disk motor) is arranged on a correspondingly enlarged diameter opposite to the brake drum on the elongated cast body.

Summarizing, the new housing construction results in a clear reduction of mounting time and in a constructional simplification followed by saving material and a reduction of constructional size (e.g. by doing without elements like shaft screwing, end bearing of the drive shaft and ventilator unit).

In the following the invention will be explained in more detail with reference to preferred embodiments.

DETAILED DESCRIPTION OF THE PREFERRED EMBODIMENT

Figure 1:
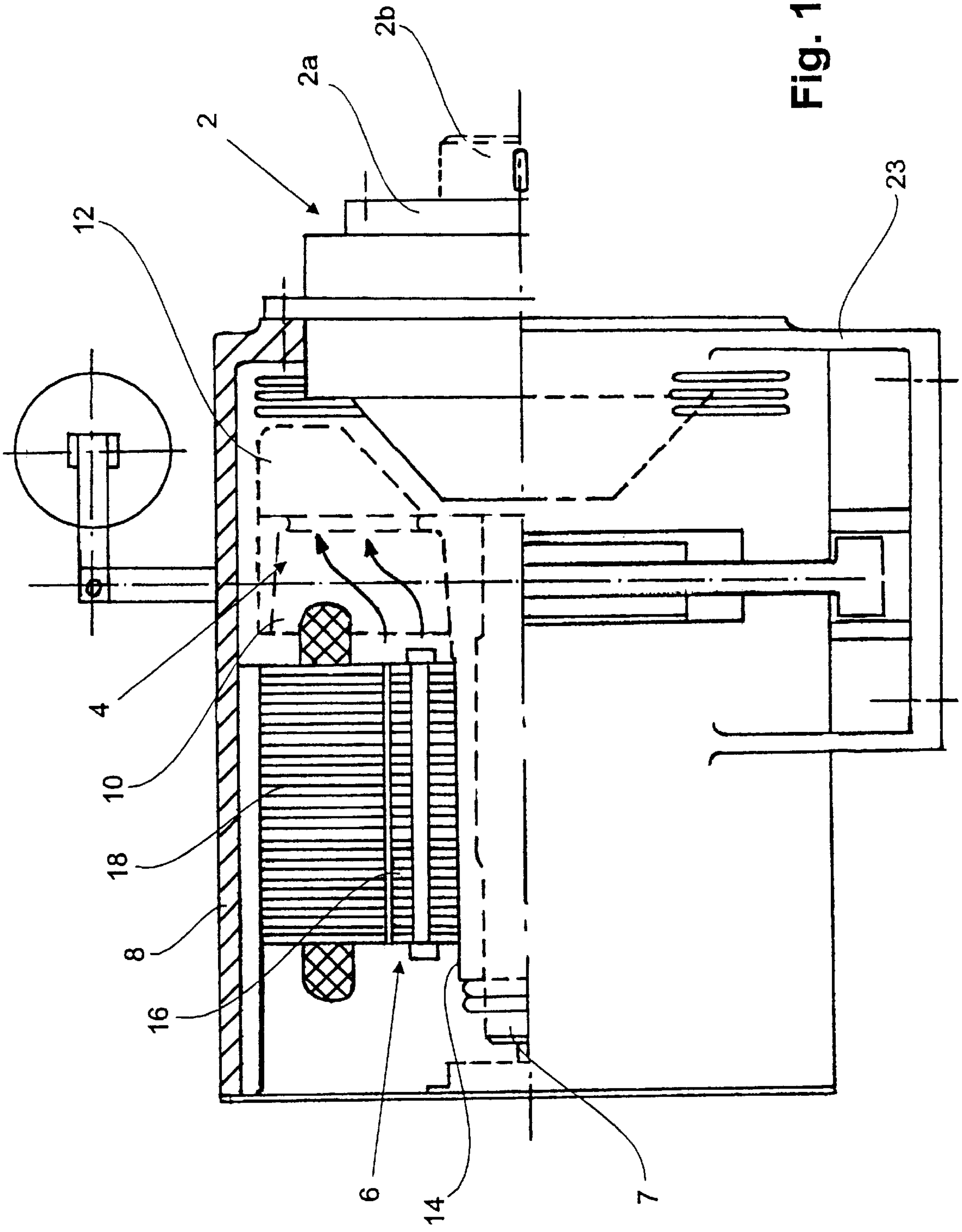
FIG. 1 is a representation of a first embodiment of the present invention.

FIG. 1 schematically shows a drive unit for an elevator including the basic components transmission 2, brake 4 and motor 6, which are arranged on a drive shaft 7 coaxially. Said housing 8 encloses said brake 4 and said motor 6 as well as one part of said transmission and supports a drive disk (not shown) for the ropes of an elevator. Said housing 8 is anchored on a foundation (not shown). Said drive disk can either be supported or mounted on the driven flange 2*a* or on the driven shaft 2*b*.

Figure 3A:
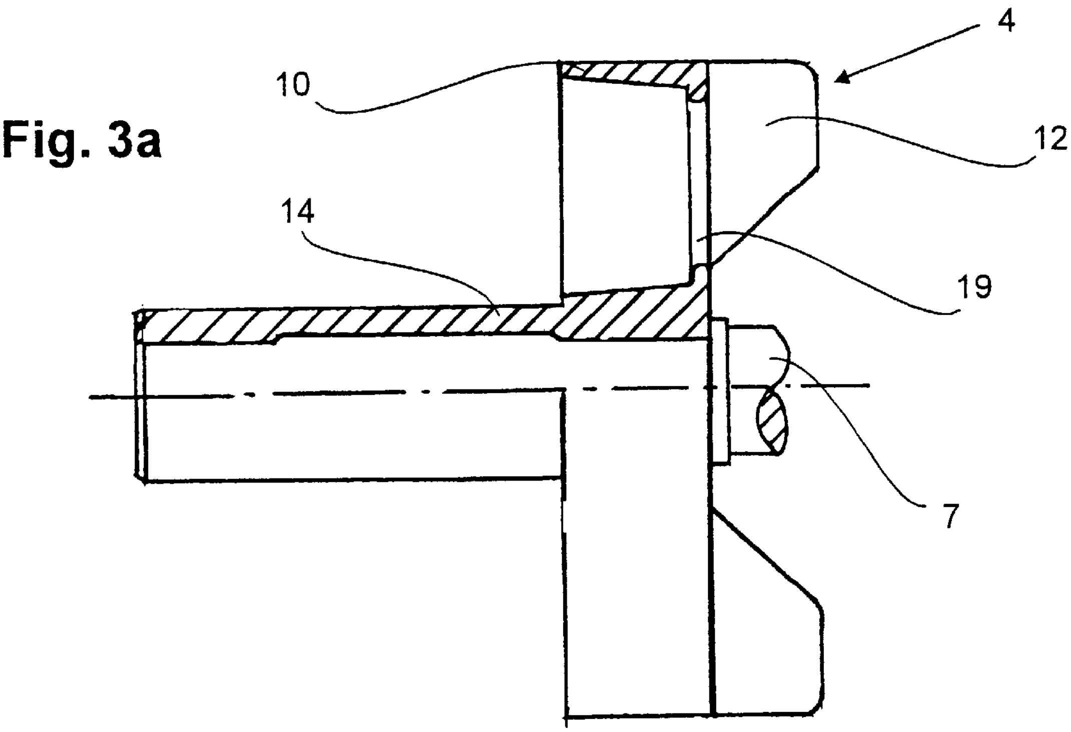
FIGS. 3*a* and *b* are representations of the brake drums of FIGS. 1 and 2, respectively.
Figure 3B:
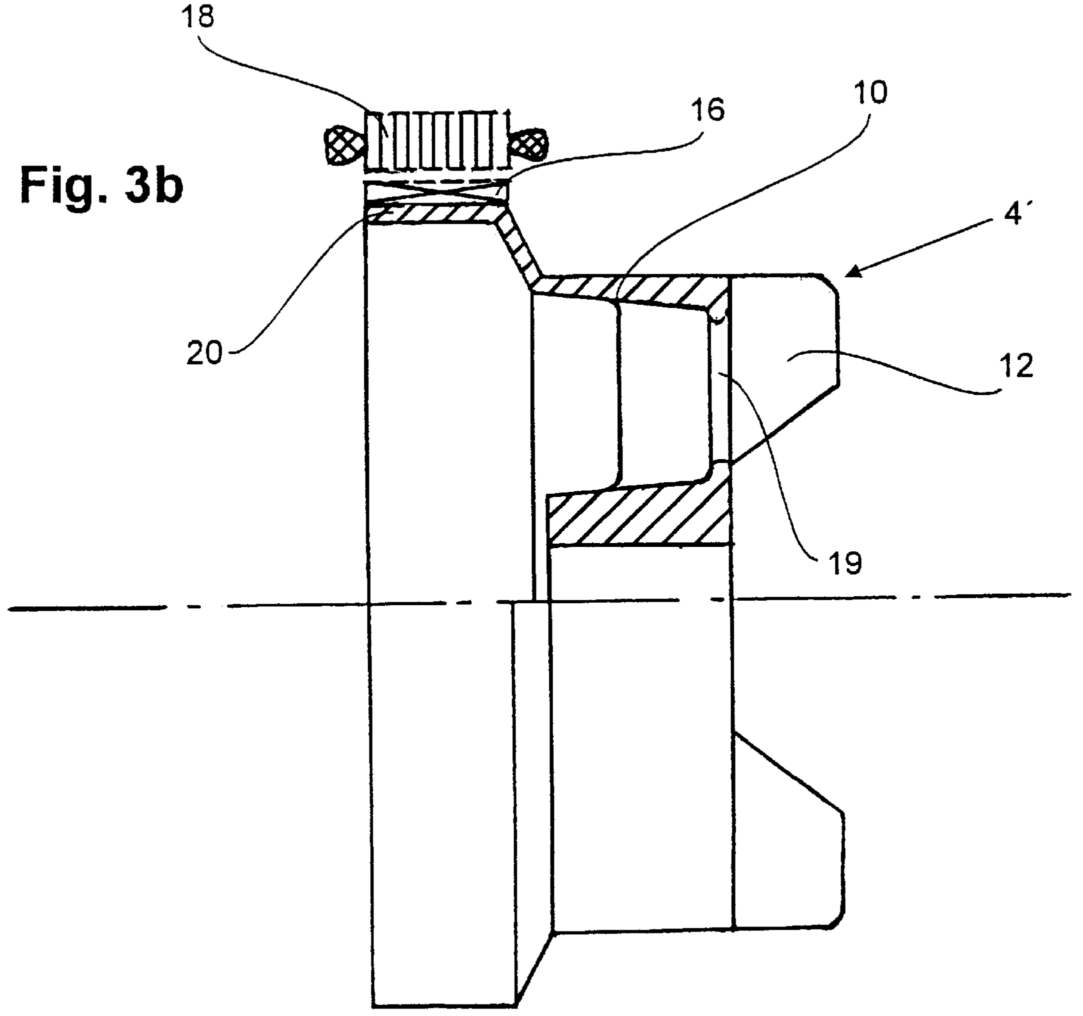

Said brake 4 comprises a brake body in the type of a cast brake drum 10 to which the ventilator blades 12 and a rotor sleeve 14 for the rotor 16 of said electromotor 6 (with rotor 16 and stator 18) are formed (see also FIG. 3*a*). The stator windings engage with said brake drum 4 (use as motor output) which e.g. comprises ventilation openings 19 (FIG. 3*a*) on its axial outer surface. When the electromotor 6 is rotating, said brake drum 10 will corotate together with said ventilator blades and said ventilator blades 12 formed thereto in uncomplicated manner realize cooling of said electromotor 6 (see the air flow indicated by arrows).

Figure 2:
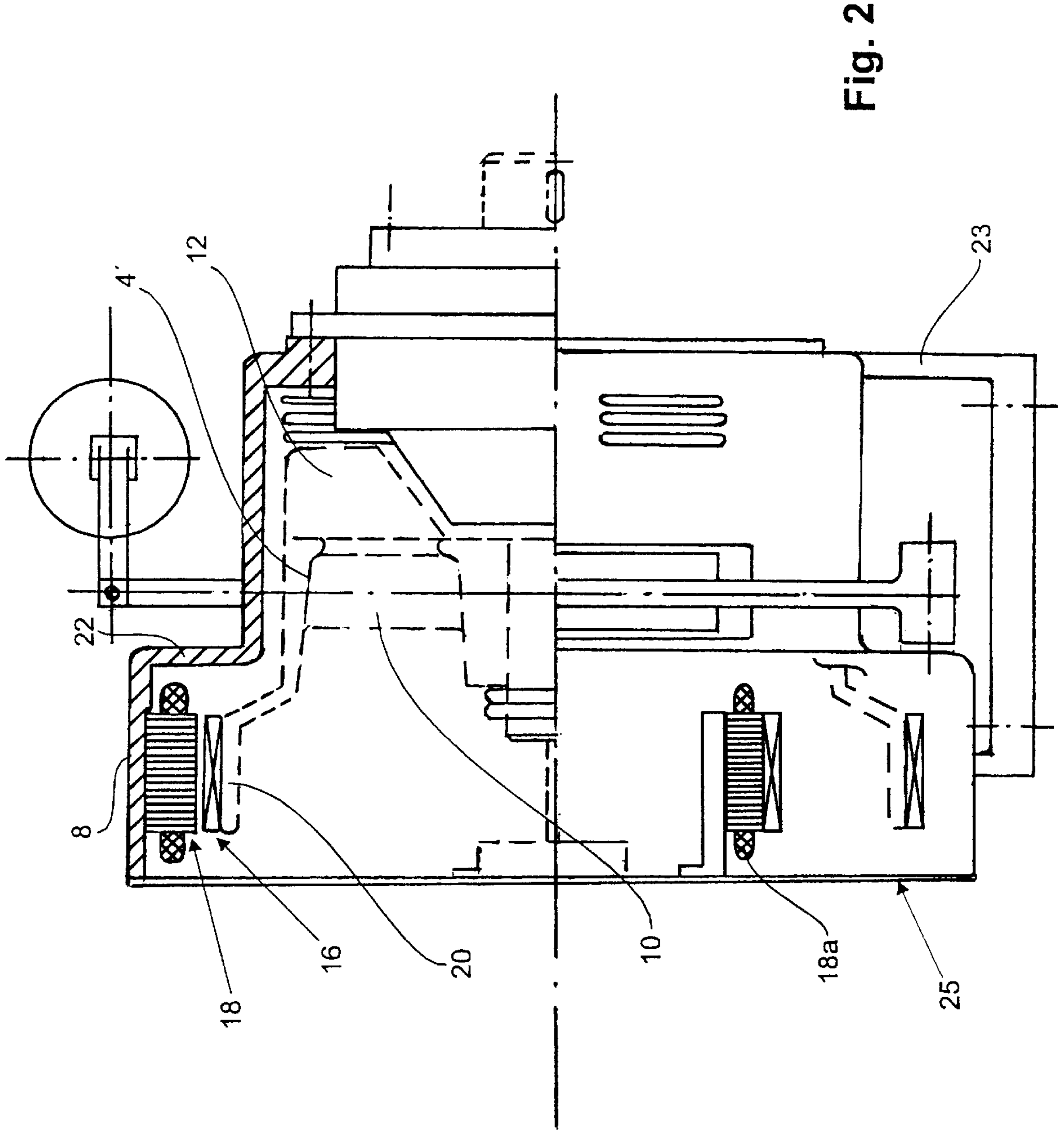
FIG. 2 is representation of a second embodiment of the present invention.

It turned out to be particularly advantageous to use a permanent magnet motor as electomotor 6, which is realized in particularly flat construction in the manner of a disk motor. Such a solution is shown in FIG. 2; in its function it corresponds to FIG. 1, but allows shorter constructional length (in direction of the drive shaft) with simultaneous enlargement of the motor diameter. Said rotor 16 of said perment magnet motor herein is arranged on a shoulder 20 displaced to the outside in step-like manner (with greater diameter than the diameter of said drum 10) on the outer wall of said brake 4' and said stator 18 again is arranged on the inside wall of said housing 8. Said housing has a clear stepping 22 for accommodating the motor, but is formed in one piece in the area of brake and motor. A base part 23 permits mounting on the foundation (not shown).

Figure 5:
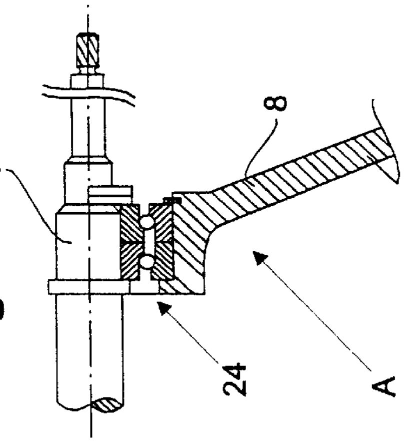
FIGS. 4 and 5 are representations of a third embodiment of the present invention.
Figure 4:
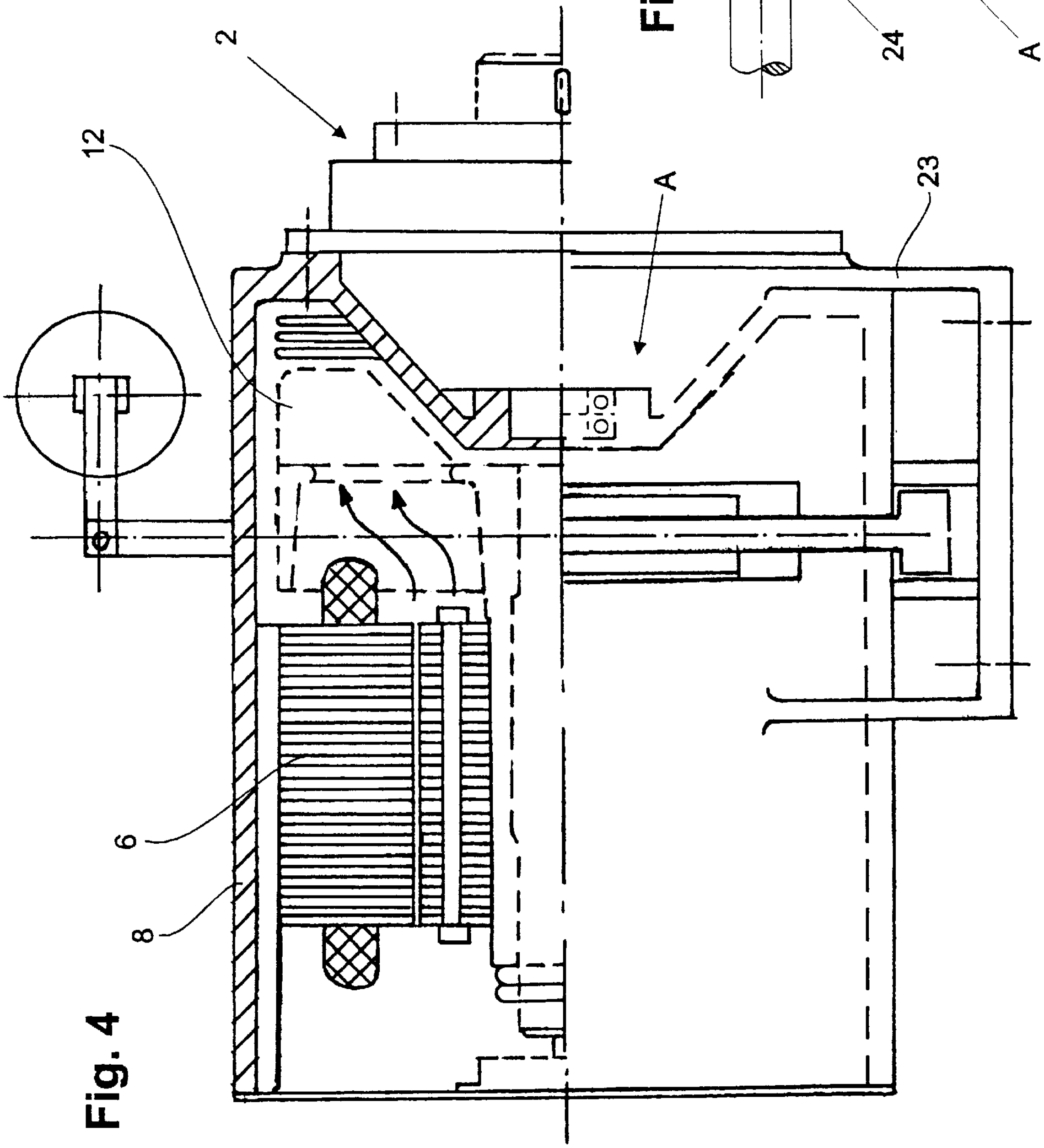

The embodiments under FIGS. 4 and 5 in their construction to the greater part correspond to the drive unit under FIG. 1, however, a section A of the housing 8 here forms a part of the otherwise separately required drive housing. The continuous drive shaft 7 therein (see enlarged sectional view in FIG. 5) is supported in the support housing exclusively (bearing 24). Said transmission 2 thus no longer is an independent unit but is intergrated as mounted part into said support housing 8.

In accordance with a modification of the present invention, furthermore, the inside space of the step rotor 16 is used for increasing motor output, an additional stator 18*a* being located on the housing cover 25 (FIG. 2). Alternatively, furthermore, the brake drum can be formed in step-less manner (not shown).

LIST OF REFERENCE NUMERALS transmission 2
driven flange 2*a*
driven shaft 2*b*
brake 4
motor 6
drive shaft 7
housing 8
brake drum 10
ventilator blade 1 2
rotor sleeve 14
rotor 16
stator 18
additional stator 18*a*
ventilation openings 19
shoulder 20
stepping 22
base part 23
bearing 24
housing cover 25

What is claimed is:

1. A compact drive unit for a hoist, in particular for a hoist for use in an elevator, comprising a housing including an end wall, a motor having a stator with a stator winding mounted in said housing, a braking mechanism comprising at least a circulating brake body mounted in said housing, a transmission outside said housing and a continuous rotatable drive shaft forming a shaft of the motor and having a rotor mounted thereon which cooperates with said stator, said shaft supporting said brake body thereon and said continuous drive shaft also forming a transmission drive shaft of said transmission, said housing, said motor, said brake body and said transmission being axially arranged together, said rotatable drive shaft being rotatably supported by said end wall which extends between said motor and said brake body in said housing on the one hand and said transmission outside said housing on the other hand, said housing end wall having a cavity for receiving at least a portion of said transmission and said stator winding of said motor protruding into an annular cavity of said brake body thereby to provide a very compact drive unit in the axial direction of said continuous drive shaft.

2. A drive unit as defined in claim 1, wherein, at least part of said transmission (2) is arranged as mounted in or built into said housing so that said housing also forms a transmission housing.

3. A drive unit as defined in claim 1, wherein said brake body is in the form of a drum (10).

4. A drive unit as defined in claim 3, wherein ventilator blades and/or a rotor sleeve is/are arranged on said brake drum.

5. A drive unit as defined in claim 4, wherein said brake drum (10) and said rotor sleeve (14) a reformed as one-piece shaped/cast part.

6. A drive unit as defined in claim 1, wherein said drive shaft (7), said motor shaft and said transmission shaft form a continuous drive shaft and said brake body is fixed within said housing (8) on said drive shaft (7).

7. A drive unit as defined in claim 6, wherein said continuous drive shaft (7) is supported in said housing (8) exclusively.

8. A drive unit as defined in claim 1, wherein said motor is a permanent magnet motor (6) having a stator (18) and a rotor (16), and said stator includes a stator winding of said motor which protrudes into a brake drum (10) forming said brake body.

9. A drive unit as defined in claim 8, wherein said permanent magnet motor (6) is a disk motor.

10. A drive unit as defined in claim 9, wherein said disk motor is arranged on a cast body seated on said drive shaft opposite to said brake drum.

11. A drive unit as defined in claim 8, wherein said rotor (16) is arranged on a step-like shoulder (20) of said brake drum (4) and said stator (18) is arranged on an inside wall of said housing (8).

12. A drive unit as defined in claim 11, wherein said rotor is elongated in parallel to a drum surface of said drum and said stepping (22) of said step-like shoulder is embodied in a reduced way.

13. A drive unit as defined in claim 11, wherein an inside space of said rotor (16) is used for increasing the motor output, an additional stator (18*a*) is arranged on a cover of said housing.

* * * * *